United States Patent
Qi

(10) Patent No.: US 9,501,714 B2
(45) Date of Patent: Nov. 22, 2016

(54) SYSTEMS AND METHODS TO IMPROVE FEATURE GENERATION IN OBJECT RECOGNITION

(75) Inventor: Yingyong Qi, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 748 days.

(21) Appl. No.: 12/915,652

(22) Filed: Oct. 29, 2010

(65) Prior Publication Data

US 2012/0106847 A1    May 3, 2012

(51) Int. Cl.
  *G06K 9/00* (2006.01)
  *G06K 9/46* (2006.01)
  *G06K 9/62* (2006.01)

(52) U.S. Cl.
  CPC .......... *G06K 9/4671* (2013.01); *G06K 9/6247* (2013.01)

(58) Field of Classification Search
  CPC ..................... G06K 9/4671; G06K 9/6247
  USPC .................................................. 382/224, 225
  See application file for complete search history.

(56) References Cited

U.S. PATENT DOCUMENTS

| | | | |
|---|---|---|---|
| 5,581,454 A | 12/1996 | Collins | |
| 6,624,992 B1 | 9/2003 | Aparin | |
| 7,054,123 B2 | 5/2006 | Ausserlechner et al. | |
| 2003/0151877 A1 | 8/2003 | Young et al. | |
| 2005/0264342 A1 | 12/2005 | Shin et al. | |
| 2009/0196510 A1* | 8/2009 | Gokturk et al. | 382/224 |
| 2009/0290794 A1 | 11/2009 | Marchesotti | |
| 2010/0149703 A1 | 6/2010 | Yeh et al. | |
| 2011/0221398 A1 | 9/2011 | Ferber, Jr. | |
| 2011/0241766 A1 | 10/2011 | Zhang et al. | |
| 2012/0236444 A1 | 9/2012 | Srivastava et al. | |

FOREIGN PATENT DOCUMENTS

| | | |
|---|---|---|
| CN | 101241549 A | 8/2008 |
| JP | 2005143063 A | 6/2005 |
| JP | 2005192302 A | 7/2005 |
| JP | 2007286808 A | 11/2007 |
| JP | 2008103945 A | 5/2008 |
| JP | 2008136262 A | 6/2008 |
| JP | 2009517997 A | 4/2009 |
| JP | 2009109252 A | 5/2009 |
| JP | 2010536197 A | 11/2010 |
| KR | 100255157 B1 | 5/2000 |
| KR | 20050112409 A | 11/2005 |

(Continued)

OTHER PUBLICATIONS

Ayers et al., "Home Interior Classification using SIFT Keypoint Histograms", Jun. 22, 2007, IEEE Conference on Computer Vision and Pattern Recognition, 2007, p. 1-6.*

(Continued)

*Primary Examiner* — Stephen R Koziol
*Assistant Examiner* — Timothy Choi
(74) *Attorney, Agent, or Firm* — Espartaco Diaz Hidalgo

(57) ABSTRACT

Present embodiments contemplate systems, apparatus, and methods to improve feature generation for object recognition. Particularly, present embodiments contemplate excluding and/or modifying portions of images corresponding to dispersed pixel distributions. By excluding and/or modifying these regions within the feature generation process, fewer unfavorable features are generated and computation resources may be more efficiently employed.

36 Claims, 9 Drawing Sheets

(56) References Cited

FOREIGN PATENT DOCUMENTS

| KR | 100972849 B1 | 7/2010 |
|---|---|---|
| WO | WO-0229950 | 4/2002 |
| WO | 2007063474 A2 | 6/2007 |
| WO | WO-2009019459 A1 | 2/2009 |

OTHER PUBLICATIONS

Ke et al., "PCA-SIFT: A More Distinctive Representation for Local Image Descriptors", Jul. 2, 2004, IEEE Conference on Computer Vision and Pattern Recognition, 2004, vol. 2, p. 506-513.*

Duda et al., "Pattern Classification", 2001, John Wiley and Sons Inc., 2nd Ed., Chapter 10.*

Gemperline et al., "Raw Materials Testing Using Soft Independent Modeling of Class Analogy Analysis of Near-Infrared Reflectance Spectra", Jan. 15, 1989, Analytical Chemistry, vol. 61, No. 2, p. 138-144.*

Hao Sun et al., "Combining local affine frames and SIFT for remote sensing image registration", Proc. of SPIE vol. 7494 74941B-1-6, Oct. 30, 2009.

Asim Imdad Wagan et al., "Map Quality Assessment", Performance Metrics for Intelligent Systems archive Proceedings of the 8th Workshop on Performance Metrics for Intelligent Systems table of contents Gaithersburg, Maryland SESSION: Technical sessions table of contents, ACM, pp. 278-282 Year of Publication: 2008.

Hongkai Xiong et al., "Subgraphs Matching-Based Side Information Generation for Distributed Multiview Video Coding", EURASIP Journal on Advances in Signal Processing, vol. 2009 (2009), Article ID 386795, retrieved from http://downloads.hindawi.com/journals/asp/2009/386795.pdf Oct. 28, 2010.

Jun Guo et al., "Multispectral remote sensing image registration based on maximally stable extremal regions", Proc. of SPIE vol. 7494 749412-1~6, Oct. 30, 2009.

David G. Lowe, "Distinctive Image Features from Scale-Invariant Keypoints", International Journal of Computer Vision, 60, 2 (2004), pp. 91-110.

Rafael C. Gonzalez et al., "Digital Image Processing Using MATLAB", Pearson Education Inc., Chapter 11, Representation and Description, pp. 426-483, 2004.

Feng-chun Tian et al., "Entropy of images after wavelet transform", Journal of Chongqing University (English Edition) [ISSN 1671-8224] vol. 7 No. 1, Mar. 2008, pp. 73-78, Article ID: 1671-8224(2008)01-0073-06.

Matej Kristan et al., "Entropy Based Measure of Camera Focus", corrected version from ERK2004, retrieved from http://citeseerx.ist.psu.edu/viewdoc/download?doi:=10.1.1.59.7145&rep=rep1 &type=pdf Oct. 28, 2010.

Linear Discriminant Analaysis, http://en.wikipedia.org/wiki/Linear_discriminant_analysis, retrieved Oct. 28, 2010.

Jianwei Wang, Eliza Yingzi Du, and Chein-I Chang, Relative entropy-based methods for image thresholding, Circuits and Systems, 2002 IEEE International Symposium, pp. II-265-II-268 vol. 2, 2002.

Chein-I Chang and Mark Althouse, Image Segmentation by local entropy methods, International Conference on Image Processing, 1995 Proceedings., pp. 61-64 vol. 3, Oct. 23, 1995-Oct. 26, 1995.

International Search Report and Written Opinion—PCT/US2011/058166—ISA/EPO—Jan. 27, 2012.

Shi, et al., "Normalized Cuts and Image Segmentation," IEEE Transactions on Pattern Analysis and Machine Intelligence, vol. 22, No. 8, pp. 888-905, Aug. 2000.

Stein A., et al., "Incorporating Background Invariance into Feature-Based Object Recognition", 2005 Seventh IEEE Workshops on Applications of Computer Vision (WACV/MOTION05)—Jan. 5-7, 2005—Breckenridge, CO, USA, IEEE, Los Alamitos, Calif., USA, Jan. 1, 2005, pp. 37-44, XP031059066, ISBN: 978-0-7695-2271-5.

Tuceryan M., et al., "Chapter 2.1, Texture Analysis", Handbook of Pattern Recognition and Computer Vision, Jan. 1, 1998, pp. 207-248.

Yu S X, et al., "Object-specific figure-ground segregation", Proceedings / 2003 IEEE Computer Society Conference on Computer Vision and Pattern Recognition, Jun. 18-20, 2003, Madison, Wisconsin; [Proceedings of the IEEE Computer Conference on Computer Vision and Pattern Recognition], Los Alamitos, Calif. [U.A, vol. 2, Jun. 18, 2003, pp. 39-45, XP010644586, DOI: 10.1109/CVPR.2003.1211450 ISBN: 978-0-7695-1900-5.

Tsuduki, Y., "Mean Shift-based Point Feature Tracking Using SIFT," Transactions of the Information Processing Society of Japan, Mar. 15, 2008, vol. 49, No. SIG6 (CVIM20), pp. 35-45.

* cited by examiner

SYSTEMS AND METHODS TO IMPROVE FEATURE GENERATION IN OBJECT RECOGNITION

TECHNICAL FIELD

The present embodiments relate to machine vision, and in particular, to methods, apparatus and systems for improved feature generation.

BACKGROUND

A wide range of electronic devices, including mobile wireless communication devices, personal digital assistants (PDAs), laptop computers, desktop computers, digital cameras, digital recording devices, and the like, employ machine vision techniques to provide versatile imaging capabilities. These capabilities may include object recognition processes/techniques which allow these systems to assist users in recognizing landmarks in their present location, identifying friends and strangers, along with a variety of other tasks.

These object recognition processes/techniques may identify one or more objects within an image by reducing an image of the object to a collection of key "features." Rather than trying to recognize an object from raw image pixel data, these processes/techniques instead recognize an object by comparing these features from a "training" image containing the object, with a new image which may or may not contain the object. If the new image has features which correspond to the features of the "training" image, the process may determine that the same object is present in both images. The processes/techniques may select features in such a manner that objects may be recognized under a variety of different orientations and under varied lighting conditions.

As mobile devices become increasingly compact, there exists a need for more efficient methods for performing feature generation and recognition. Such improved methods will improve the functionality of the various imaging applications which depend upon these recognition processes/techniques.

SUMMARY

Some of the present embodiments may comprise a method for generating features, performed on at least one processor. The method may comprise associating a dispersion value with at least a portion of an image and excluding at least a part of the at least a portion of the image from at least a portion of a feature generation process if the dispersion value indicates that dispersion in the at least a portion of the image exceeds a threshold. In some embodiments, excluding the portion may comprise substituting the at least a portion of the image with different values before the at least a portion of the image is processed by the at least a portion of the feature generation process. In some embodiments, the dispersion value may comprise a measure of the entropy of the pixel values within the portion of the image. In certain embodiments, the dispersion value may comprise a frequency characteristic of the portion of the image. In certain embodiments, the dispersion value may be based on at least a between class variation and a within class variation of pixel values in the portion of the image. In certain embodiments, associating a dispersion value may comprise associating pixels within the at least a portion of the image with a quantization value; determining the first moment for collections of pixels having the same quantization value; and measuring the distance between the first moments of at least two collections. In certain embodiments, the distance between the first moments of at least two collections may be inversely proportional to the value of the dispersion value. In some embodiments, the feature generation process may comprise at least a portion of a scale-invariant feature transform (SIFT). In some embodiments, the feature generation process may comprise a module configured to compute a scale-space difference of an image.

Some embodiments may comprise a non-transitory computer-readable medium comprising instructions configured to cause an electronic device to perform the steps of: associating a dispersion value with at least a portion of an image; and excluding at least a part of the at least a portion of the image from at least a portion of a feature generation process if the dispersion value indicates that dispersion in the at least a portion of the image exceeds a threshold. In some embodiments, excluding the portion may comprise substituting the at least a portion of the image with different values before the at least a portion of the image is processed by the at least a portion of the feature generation process. In some embodiments, the dispersion value may comprise a measure of the entropy of the pixel values within the portion of the image. In certain embodiments, the dispersion value may comprise a frequency characteristic of the portion of the image. In certain embodiments, the dispersion value may be based on at least a between class variation and a within class variation of pixel values in the portion of the image. In some embodiments, associating a dispersion value may comprise: associating pixels within the at least a portion of the image with a quantization value; determining the first moment for collections of pixels having the same quantization value; and measuring the distance between the first moments of at least two collections. In some embodiments, the distance between the first moments of at least two collections may be inversely proportional to the value of the dispersion value. In certain embodiments, the feature generation process may comprise at least a portion of a scale-invariant feature transform (SIFT). In some embodiments, the feature generation process may comprise a module configured to compute a scale-space difference of an image. In some embodiments, the electronic device may comprise a wireless telephone.

Some embodiments may comprise an electronic device comprising instructions configured to perform the steps of: associating a dispersion value with at least a portion of an image; and excluding at least a part of the at least a portion of the image from at least a portion of a feature generation process if the dispersion value indicates that dispersion in the at least a portion of the image exceeds a threshold. In certain embodiments, excluding the portion may comprise substituting the at least a portion of the image with different values before the at least a portion of the image is processed by the at least a portion of the feature generation process. In some embodiments, the dispersion value may comprise a measure of the entropy of the pixel values within the portion of the image. In some embodiments, the dispersion value may comprise a frequency characteristic of the portion of the image. In some embodiments the dispersion value may be based on at least a between class variation and a within class variation of pixel values in the portion of the image. In certain embodiments, associating a dispersion value may comprise: associating pixels within the at least a portion of the image with a quantization value; determining the first moment for collections of pixels having the same quantization value; and measuring the distance between the first moments of at least two collections. In some embodiments, the distance between the first moments of at least two collections may be inversely proportional to the value of the dispersion value. In some embodiments, the feature generation process may comprise at least a portion of a scale-invariant feature transform (SIFT). In some embodiments, the feature generation process may comprise a module configured to compute a scale-space difference of an image. In certain embodiments the electronic device may comprise a wireless telephone.

Some embodiments may comprise an electronic device comprising: means for associating a dispersion value with at least a portion of an image; and means for excluding at least a part of the at least a portion of the image from at least a portion of a feature generation process if the dispersion value indicates that dispersion in the at least a portion of the image exceeds a threshold. In certain embodiments, the associating means may comprise a dispersion discriminator software module configured to determine a between class variance and a within class variance, and wherein the excluding means may comprise a switch. In certain embodiments, excluding the portion may comprise substituting the at least a portion of the image with different values before the at least a portion of the image is processed by the at least a portion of the feature generation process. In some embodiments, the dispersion value may comprise a measure of the entropy of the pixel values within the portion of the image. In some embodiments, the dispersion value may comprise a frequency characteristic of the portion of the image. In some embodiments, the dispersion value may be based on at least a between class variation and a within class variation of pixel values in the portion of the image. In some embodiments, the means for associating a dispersion value may comprise: means for associating pixels within the at least a portion of the image with a quantization value; means for determining the first moment for collections of pixels having the same quantization value; and means for measuring the distance between the first moments of at least two collections. In some embodiments, the distance between the first moments of at least two collections may be inversely proportional to the value of the dispersion value. In some embodiments, the feature generation process may comprise at least a portion of a scale-invariant feature transform (SIFT). In some embodiments, the feature generation process may comprise a module configured to compute a scale-space difference of an image. In some embodiments, the electronic device may comprise a wireless telephone.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
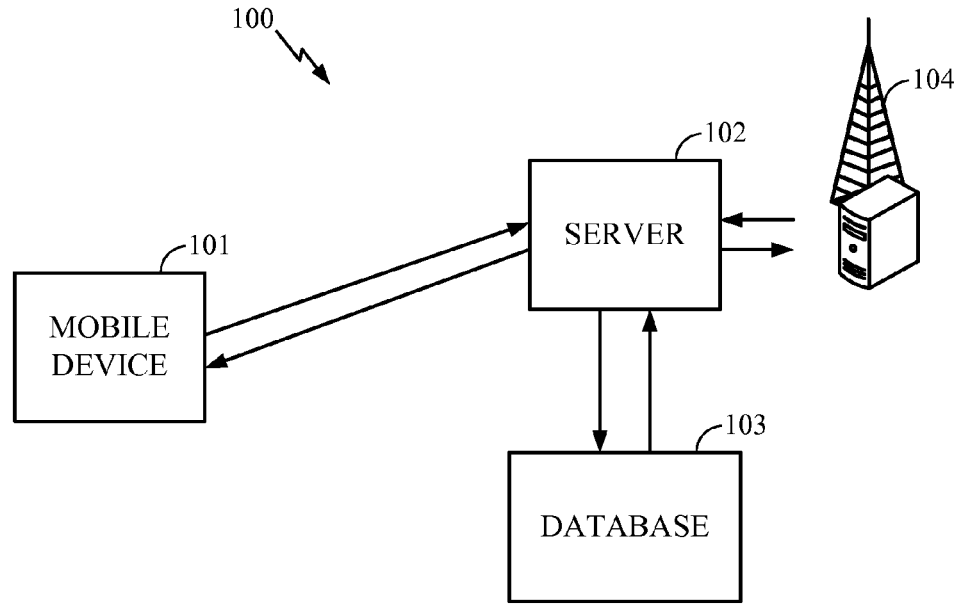
FIG. 1 is a generalized block diagram depicting a mobile device in relation to a server, database, and network transmission system, where one or more of the devices implement certain of the present embodiments.

Implementations disclosed herein provide systems, methods and apparatus for improved feature generation in an object recognition system. Particularly, the present embodiments contemplate modifying a variety of feature generation processes so as to exclude portions of an image which generate unfavorable object recognition features. One skilled in the art will recognize that these embodiments may be implemented in hardware, software, firmware, or any combination thereof.

Some embodiments relate to a method or system for generating features of an image, performed on at least one computer processor. In this method, a dispersion value associated with at least a portion of an image may be generated. Dispersion generally refers to the separation of similar pixels from one another in the image region. Where similar pixels reside near one another, dispersion is lower. Where many intervening dissimilar pixels separate the similar pixels, dispersion is higher. One may also define dispersion as "high" when the pixels are so similar that no distinguishable groups can be said to exist. Note that similar pixels may be "dispersed" as a whole, even if individual similar pixels reside beside one another in widely separated "clumps" or groups in the image. A "dispersion value" may indicate the degree of dispersion.

The method excludes the portion of the image from at least a portion of a feature generation process if the dispersion value indicates that pixel dispersion in the image portion exceeds a threshold. One skilled in the art will readily recognize that the threshold referred to here is with regard to the degree of dispersion, and that an actual implementation may represent the threshold in a variety of forms (such as an inverse, or range). Thus, "exceeding a threshold" indicates that a sufficient amount of dispersion is present, regardless of whatever particular implementation is employed to describe that condition. This feature generation method may be useful, for example, in a cellular telephone that is performing image recognition on a captured image. By excluding portions of the image that have a dispersed pixel distribution above a threshold, the system can remove those portions from a feature generation process. Other regions, such as regions of substantially-similar pixels may also be removed as there are no distinguishable pixel groups. This method may save computational resources as the features are neither generated nor recognized in a subsequently captured image.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Object recognition systems allow computer devices to identify one or more objects within an image. These systems generally comprise a first set of processes for learning visual features of the object in a first set of images and a second set of processes for subsequently recognizing those features in a second set of new images. The first set of images may be referred to herein as "training" images and the second set may be referred to as "test", "live", or "in-field" images. The first set of processes extract features from the training images, which are representative of the objects to be recognized. In the second step, the system may identify an object by recognizing these features in the test or live images.

A feature generation process identifies features in a training image which are useful to identify the object contained therein. Features which complicate or have little relevance to recognizing the object should be excluded. Present embodiments contemplate novel systems and methods to improve feature generation. Particularly, present embodiments exclude portions of the image from the feature generation process which may generate undesirable features. Particularly, embodiments correct for the fact that feature generation systems regularly identify unfavorable features in image regions depicting textures, random pixels, or other areas of "dispersed" pixel distribution. Some embodiments may further improve computation by removing image portions from the process which are unlikely to generate features, such as regions comprising only identical, or substantially-similar, pixels. By excluding and or modifying these regions within the feature generation process, fewer unfavorable features may be generated and/or computation time and resources will be saved. The present embodiments may recognize these regions in the raw pixels of the "training" image, but may recognize them in alternative representations, such as frequency, scale-space, n-dimensional representations (as are used in support vector machines), or other representations common to different feature generation processes and as are familiar to one skilled in the art. In this manner, the system benefits both by not directing resources to generate these features, and by not using these features during subsequent recognition. While these improvements yield benefits in any system employing a feature generation process, they are particularly useful for mobile devices where computation time and efficiency are at a premium.

FIG. 1 depicts a high-level block diagram of a communications system 100 comprising a mobile device 101 in relation to a server 102, database 103, and network 104, such as a cellular network. Mobile device 101 may comprise a cell phone, laptop, personal digital assistant, or the like. Mobile device 101 may be in communication with server 102, which is itself in communication with a database 103. Server 102 may be located at a cellular base station or may be located on a local network server or router. Database 103 may similarly be located inside server 102, or at a separate location. Mobile device 101 may comprise a camera or include other means for receiving images, such as a USB, WI-FI, or Bluetooth connection. A plurality of applications may be available to the user on mobile device 101. These applications may include messaging services, image capture applications, and other common applications known to one skilled in the art. Some of the applications on mobile device 101 may operate on images received from a remote location, or operate upon images generated locally by mobile device's 101 camera. In some embodiments, database 103 may comprise an image storage, and mobile device 101 may transmit and/or receive images via server 102 to and/or from database 103. These images may be generated or used by the applications operating on mobile device 101.

As mentioned above, feature generation processes generate "features" which may be subsequently used to recognize objects in an image. In some embodiments, database 103 may comprise a collection of features used to identify objects within images. These features may be generated from a feature generation process which received a "training" image, as described in greater detail below. When an application on the mobile device 101 wishes to identify an object in an image, mobile device 101 may retrieve features from database 103 in order to apply the features as part of a feature recognition process. Alternatively, the features may be stored locally on mobile device 101. Features may be uploaded to the database 103 by mobile device 101 after receiving a training image. Server 102 may also be in communication with network 104 and receive images or features remotely from the network. Thus, either mobile device 101 or database 103 may contain images or features stored for recognition.

Although FIG. 1 depicts a mobile system, one skilled in the art will readily recognize that the present embodiments may also apply to any imaging system. A desktop system, comprising local image storage, for example, may also implement many of the present embodiments as part of locally running feature generation processes.

Figure 2:
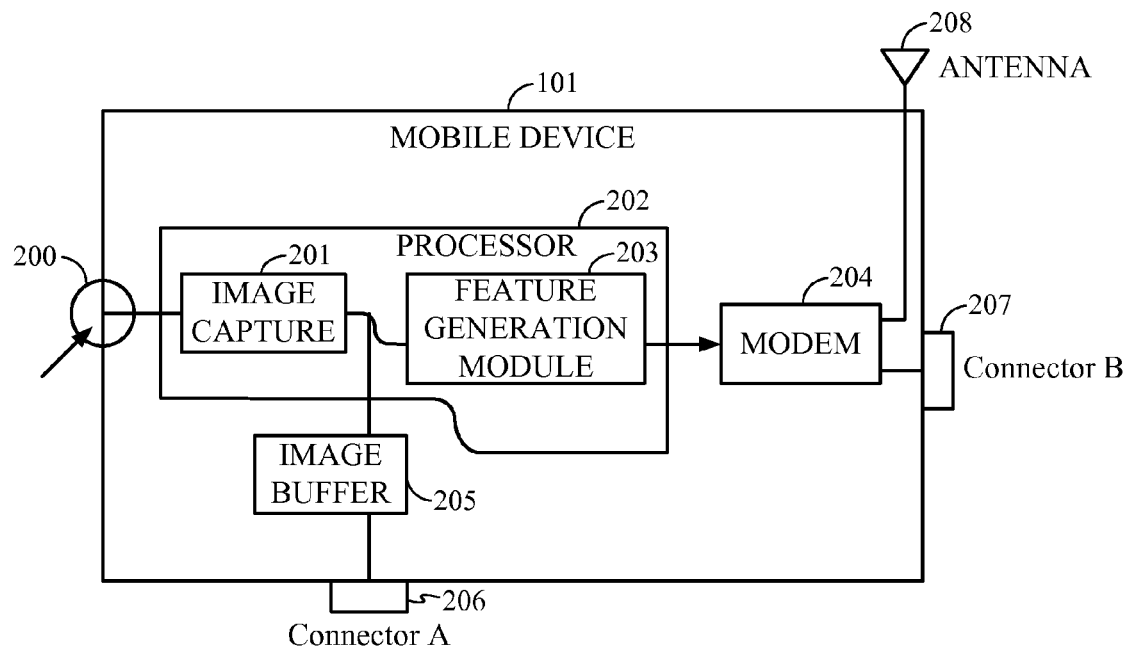
FIG. 2 is a block diagram of the mobile device's various components which certain imaging applications associated with some of the present embodiments may employ.

FIG. 2 depicts a block diagram of various components of the mobile device 101 which may be employed in the imaging applications of some embodiments. Mobile device

101 may comprise an image capturing system 201, which captures images via lens 200. These images may be stored in image buffer 205, which may comprise RAM, SRAM, dynamic or static memory as are known in the art. Alternatively, images or features may be received via connector 206, which may comprise a firewire, USB, IR transceiver, Bluetooth interface, or the like. These images or features may be received, for example, when another user transmits them from another device, or when the user of mobile device 101 connects to a local network or storage device, such as a desktop computer.

Mobile device 101 may also comprise a modem 204 for transmitting or receiving information, including images and feature data via an antenna 208 or connector 207. Antenna 208 may be a wireless antenna used for connecting to a WI-FI, cellular network, or the like. Once features have been identified, the user may upload them via modem 204 to database 103 so that they may be recalled during a subsequent recognition attempt. Alternatively, the features may be stored locally.

The image capture system 201 may comprise a standalone hardware, software or firmware module. However, in some embodiments the image capture system may be integrated into the mobile device 101's processor 202 as depicted in FIG. 2, as a component in a processor, or software running on the processor 202. The Image Capture System operates lens 200 so as to generate an image. Processor 202 may be a general purpose processing unit or a processor specially designed for imaging applications.

Processor 202 may comprise a feature generation module 203 which may itself comprise software running on the processor 202, a dedicated component in a processor, or a separate standalone hardware, software, or firmware module or the like. The feature generation module 203 may comprise a scale-invariant feature transform (SIFT) core module. SIFT comprises one possible feature generation process benefiting from the present embodiments. The feature generation module 203 may comprise software, firmware, or hardware designed to perform one or more additional feature recognition processes. For example, variations on the SIFT process, referred to herein as the "SIFT process family" may comprise "traditional" SIFT, PCA-SIFT, SURF, FIT, Affine-Invariant SIFT, RIFT (Rotational Invariant SIFT), G-RIF (generalized robust invariant feature), and GLOH (gradient location and orientation histogram), etc. Feature generation module 203 may be able to select among various feature generation processes given a particular set of circumstances. For example, traditional SIFT may be employed for applications possessing a first set of resources, whereas SURF may be employed under a second set of circumstances. For ease of comprehension, the below description discusses primarily the SIFT feature generation process, however, one skilled in the art will readily recognize application of the present embodiments to other feature generation processes.

As an example of the mobile device's 101 operation, the mobile device user may want to take another person's facial image, so that should the mobile user forget the person's face, they could still recognize that person at a later date. The mobile device user may also want to take a picture of an object, such as a DVD cover, and extract features of all or part of the image or text (or image and text) of the DVD cover. Similarly, the user may wish to recognize product labels, such as on wine bottles or music cd's. In these examples, the user may have previously acquired the "training" images themselves, or the "training" images may be prestored in a database, such as database 103. Mobile device 101 may capture an image using lens 200 and image capture system 201. The image may be stored in the buffer 205 and then processed by the feature generation module 203 to extract features which are transmitted via modem 204 and antenna 208 to server 102. Server 102 may then store the features in database 103. Later, when the user encounters the same person again, they may again take the person's picture with mobile device 101. Mobile device 101 may retrieve the features from database 103 via antenna 208 and modem 204 and use the features to perform feature recognition on the newly captured image. Alternatively, the image may be uploaded to database 103. In this manner, the user may determine the identity of the person in the second encounter. One skilled in the art will readily recognize that various of the operations described above may be performed alternatively on the mobile device or server. For example, the feature generation module 203 may instead be located on server 102 and mobile device 101 may transmit raw images for feature recognition rather than perform feature recognition operations locally.

As mentioned, the following description of certain embodiments is made with respect to the SIFT family of feature generation processes. One skilled in the art will readily recognize, however, that the embodiments described in FIGS. 5 and 6, may be made to such feature generation processes as null-space PCA, support vector machines, neural networks and the like.

Figure 3:
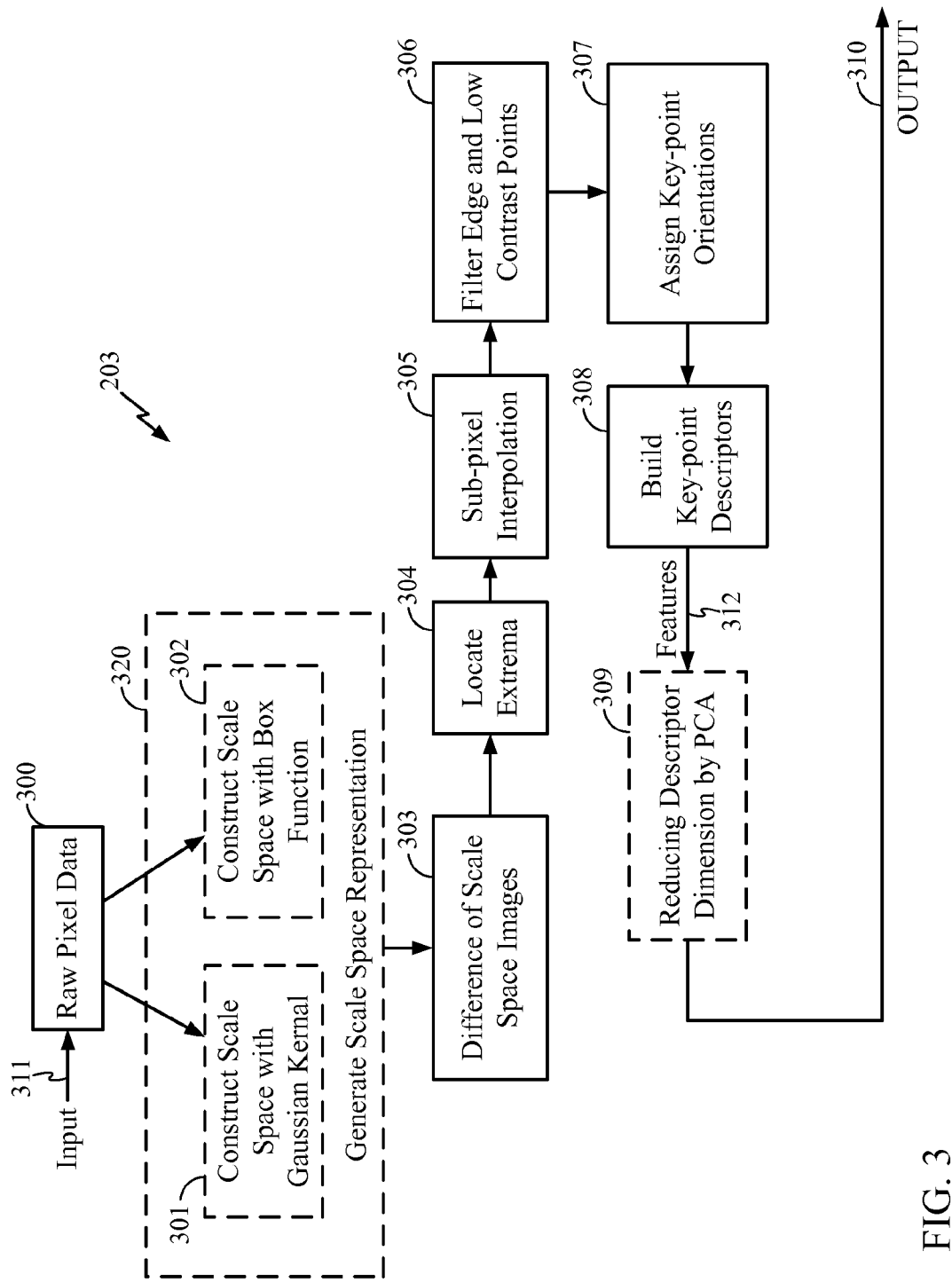
FIG. 3 is a flow diagram depicting several steps found in various of the SIFT family feature generation processes as may be implemented in the feature generation module of certain embodiments.

FIG. 3 is a flow diagram depicting many steps in a SIFT family of feature generation process. Certain of the depicted steps are common to many of the processes, while others are specific to only certain family members. For example, "traditional" SIFT will generate a scale space representation 301 using a gaussian kernel, whereas SURF may instead use a box function 302. Generally speaking, the SIFT family of processes comprise the steps of "scale-space extrema detection", "keypoint localization", "orientation assignment", and "generation of keypoint descriptors". A version of SIFT is described in detail in the publication David G. Lowe, "Distinctive image features from scale-invariant keypoints," *International Journal of Computer Vision*, 60, 2 (2004), pp. 91-110 (hereinafter Lowe). One skilled in the art may recognize that Lowe's terminology does not exactly correspond with the terminology of the present application.

The SIFT family of processes generally begin by receiving raw image pixel data 300 as input 311 from a camera or from storage. These raw pixels are converted to a "scale space representation" 320. The scale space is a signal processing technique readily known to one skilled in the art, wherein the raw image 300 is "blurred" to produce a "blurred" representation at various scales. The representation at various scales may be referred to as a "pyramid" representation, as multiple versions of the image are produced at varied scales and degrees of blurring. In this manner, the image is converted to a form where transformations are invariant with regard to image scale, i.e. "generalizing" the raw pixel information.

Constructing the scale space representation may involve the application of a "kernel" to the image at various scales, such as by convolution. As mentioned, some processes, such as traditional SIFT may construct the scale space image representation using a gaussian kernel 301. Other processes, such as SURF, may construct the scale space representation with a box function 302. After conversion to the scale space the system may take the difference of the scale space image with the original image. This "difference of images" 303 may indicate regions of high contrast. These regions of high contrast, or "extrema" may be identified as local minima/maxima of the difference of the images across scales. For example, each pixel in the difference image may be compared to neighbors in its same scale and to neighbors in other varied scales. If the pixel value is a maximum or minimum among all compared pixels, it is identified as a region of interest known as a "keypoint". This may generally be referred to as "keypoint localization" and is described in greater detail in Lowe. The keypoints may be used to generate features.

For example, sub-pixel interpolation 305 may be performed around keypoints to determine the keypoint's position to a less than pixel-size accuracy. The system may then filter keypoints 306 at edges and regions of low contrast to minimize erroneously determined keypoints. Next, to achieve orientation invariance of the features, each gradient is assigned an "orientation" 307 based on the direction of the maximum or minimum pixel value gradient. In this manner, the keypoints may be described in a rotation invariant manner (i.e., with regard to the gradient rather than some arbitrary coordinate axis). In some embodiments the gradients may be computed for each level of the scale-space pyramid. This may generally be referred to as "orientation assignment" and is described in greater detail in Lowe.

At this point, each key-point may be associated with an image location, scale, and orientation. Keypoint descriptors may then be assigned 308 to ensure a scale and rotationally invariant representation of the keypoint. This may be done by computing the gradient magnitude and orientation at each image sample point in a region around the keypoint. These samples may be accumulated into orientation histograms summarizing the contents of the subregions. This may generally be referred to as generation of keypoint descriptors" and is described in greater detail in Lowe.

These keypoints in conjunction with their descriptors, comprise the "features" 312 which may be output 310 and stored for subsequent recognition. One skilled in the art will readily recognize that the features may be "compressed" or "reduced" to facilitate more efficient storage. In SIFT-PCA, for example, the number of features output by the system may be reduced by performing a principal component analysis (PCA) 309 of the feature set. PCA is a mathematical procedure, particularly an eigenvector-based multivariate analysis, which transforms a number of possibly correlated variables into a smaller number of uncorrelated variables called principal components. Once transformed, the greatest variance for any projection of the data lies on a first principal coordinate, the next greatest along a second, etc. As the initial principal components comprise the most information, one can usually remove the later components while still retaining a fair description of the data. In this manner, PCA may be used to reduce the number of dimensions required to describe the data permitting improved storage of the features in, for example, database 103.

Figure 4:
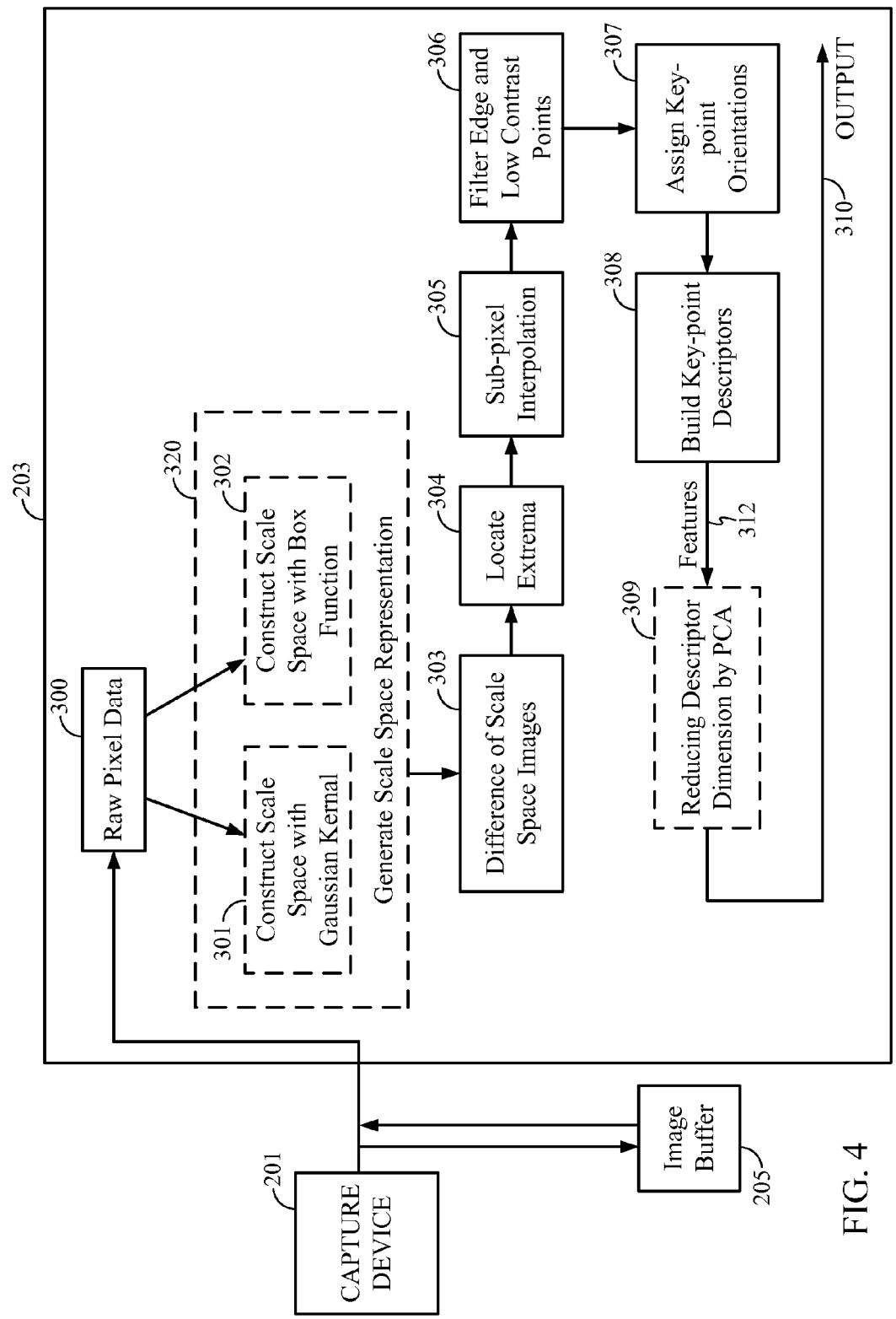
FIG. 4 is a generalized block diagram illustrating placement of the flow diagram of FIG. 3 in relation to other components of the mobile device's feature recognition system.

FIG. 4 illustrates the above feature generation process, which may be found in the feature generation module 203, in relation to other components of the mobile device, particularly image capture device 201 and image buffer 205. Upon capturing an image and storing it in buffer 205, the system may pass the raw image pixels 300 to the feature generation module 203 which may perform the feature generation process outlined above.

Many feature generation processes, including the above-described members of the SIFT process family, determine regions of interest in an image by identifying regions of high frequency detail. For example, in the SIFT process, the difference of the scale space representations indicates regions of "extrema" which subsequently may become keypoints. The differences between the representations are equivalent to regions of high frequency (i.e. regions of great change between neighboring pixels). Where these types of regions of an image are few and sparsely separated, these high frequency determinations perform well. Unfortunately, random noise has a high spatial frequency and may accordingly generate features with little relevance to object recognition. Similarly, areas of an image comprising a texture, such as clusters of leaves in a tree, large clusters of grass blades, or patterns in clothing, may also generate less favorable features. These "dispersed" textures comprise image regions which contain significant variance between nearby pixels, i.e. high frequency information. These regions not only produce features providing little benefit to the object recognition procedures, but they also consume valuable time and resources in the feature generation and recognition processes. Accordingly, the present embodiments contemplate systems and methods for removing the portions of the image which generate these features from feature generation processes which identify regions of high frequency. Again, though the SIFT-family has been described in detail above, one skilled in the art will readily recognize that the disclosed techniques will apply to other processes which generate unfavorable features in high frequency regions.

Figure 5:
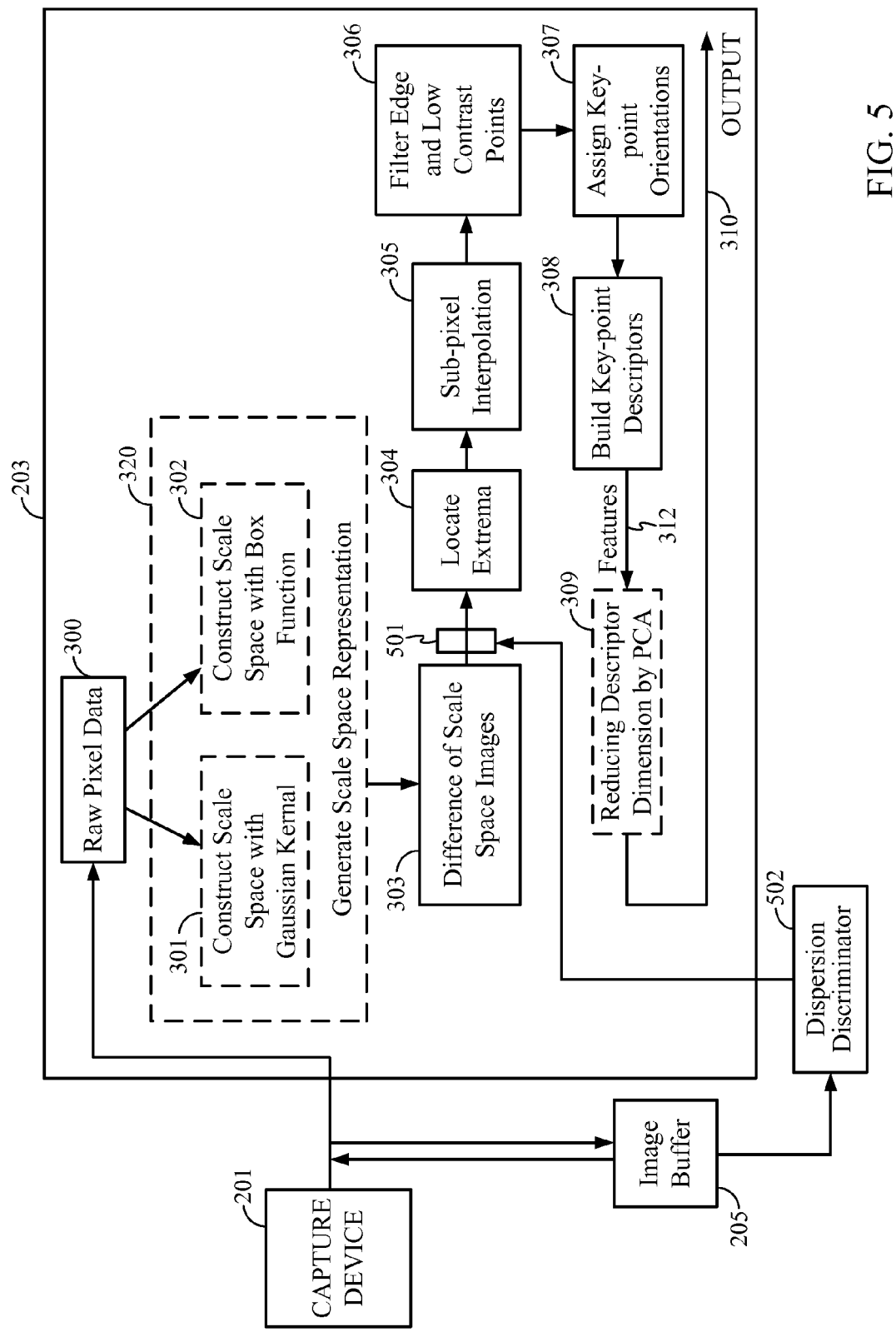
FIG. 5 depicts the placement and operation of the dispersion discriminator as used in certain embodiments in relation to the components of FIG. 4.
Figure 6:
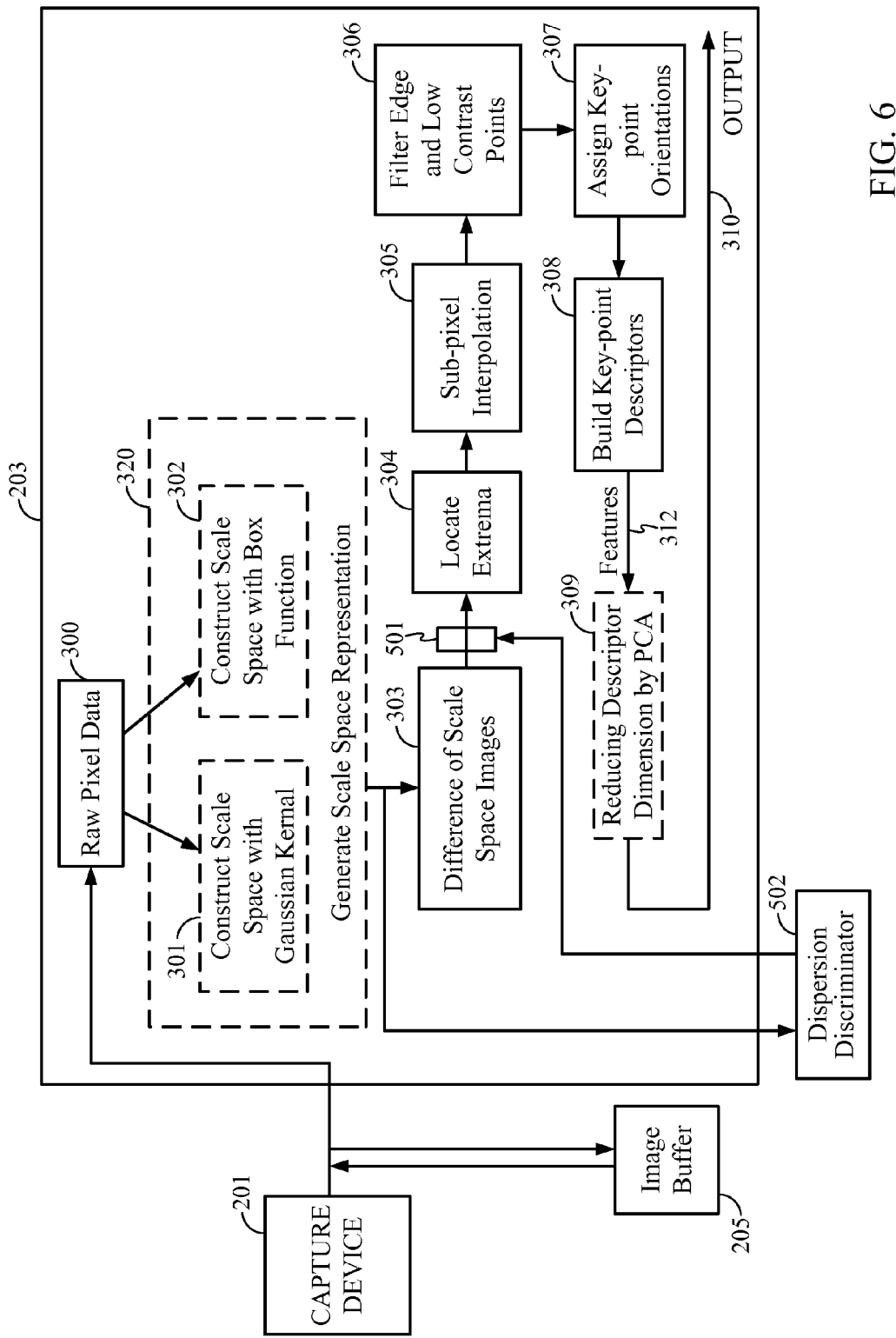
FIG. 6 depicts the placement and operation of the dispersion discriminator as used in certain embodiments in relation to the components of FIG. 4.

Present embodiments contemplate the incorporation of a "dispersion discriminator" within or outside a feature generation process. The dispersion discriminator may comprise software (such as a software module), hardware, or firmware. The dispersion discriminator may exclude portions of the image, such as regions of dispersed texture, from further analysis by the feature generation process. For example, the discriminator may simply not provide these portions to the process for processing, or it may replace these portions with values which will not generate unfavorable features. In this manner, the system may recognize relevant features more accurately and more efficiently. FIGS. 5 and 6 depict block diagrams illustrating placement of a dispersion discriminator in relation to other components of the mobile device's feature recognition system. Placement of the discriminator in FIGS. 5 and 6 are for illustrative purposes with respect to SIFT. One skilled in the art will readily recognize, however, that the discriminator may be similarly placed in a system incorporating null-space PCA, support vector machines, neural networks and other feature generation processes. The placement and operation of the dispersion discriminator need only be modified, as one skilled in the art would readily recognize, so as to filter portions of the image which correspond to the dispersed raw pixel data as described below.

In one embodiment, illustrated in FIG. 5, the dispersion discriminator 502 analyzes the raw image pixels 300 as they are found in the image buffer 205 after capture device 201 acquires an image. The discriminator determines regions of dispersion in the pixels which may comprise unfavorable textures. The discriminator may also determine regions with little or no variation, such as blocks of identical pixels. The discriminator 502 may comprise or operate in conjunction with a switch 501, or other excluding means, to exclude these regions from the subsequent feature analysis. In FIG. 5, switch 501 is illustrated as performing a gate keeping function at the difference of scale-space images. One skilled in the art would readily recognize that the raw pixels may be modified or excluded by placing switch 501 before the raw pixel data 300 is converted to the scale space. Conversely, switch 501 may be placed further in the process, say after location of extrema 304. In this manner keypoints may be modified or excluded after the discriminator has determined that they comprise a dispersed texture. One skilled in the art will readily understand that though the switch is referred to as an "excluding means" other devices which modify rather than remove the image content to avoid generation of the unfavorable features likewise comprise "excluding means" as they similarly exclude portions responsible for unfavorable features.

As another example, shown in the embodiment of FIG. 6, the discriminator instead operates on the scaled-space image, i.e. the blurred images. Here, the switch 501 also operates on the scaled spaced images to exclude or modify their contents from the remainder of the process. The discriminator's thresholds and parameters are modified to receive scale-space data rather than raw pixels to again exclude regions of high dispersion from the remainder of the process. These modifications are described in greater detail below. Thus, one skilled in the art would recognize that switch 501 may be placed anywhere in the process prior to being output 310.

Some systems may implement more than one feature recognition process within the feature generation module 203, or they may operate multiple feature generation modules 203. For example, in some circumstances better results may be achieved using one recognition process over another. SIFT may be used when storage resources are readily available, while PCA-SIFT may be used when storage space is limited. In certain of the present embodiments the dispersion discriminator 502 may be in communication with the device which selects between the recognition methods. Depending on the circumstances under which an image is taken, the mobile device 101 may execute one feature recognition method over another (accuracy vs. speed, subject matter in the image, etc.). Although the above embodiments have illustrated effective placement of the discriminator, one skilled in the art will readily recognize that the discriminator may operate to exclude pixels at any point in the process prior to output. For example, keypoints may be removed during filtering 306 or after descriptors 308 are prepared. However, operation at different locations in the process may require that the dispersion discriminator be modified to operate on data appearing at the particular location.

Figure 7:
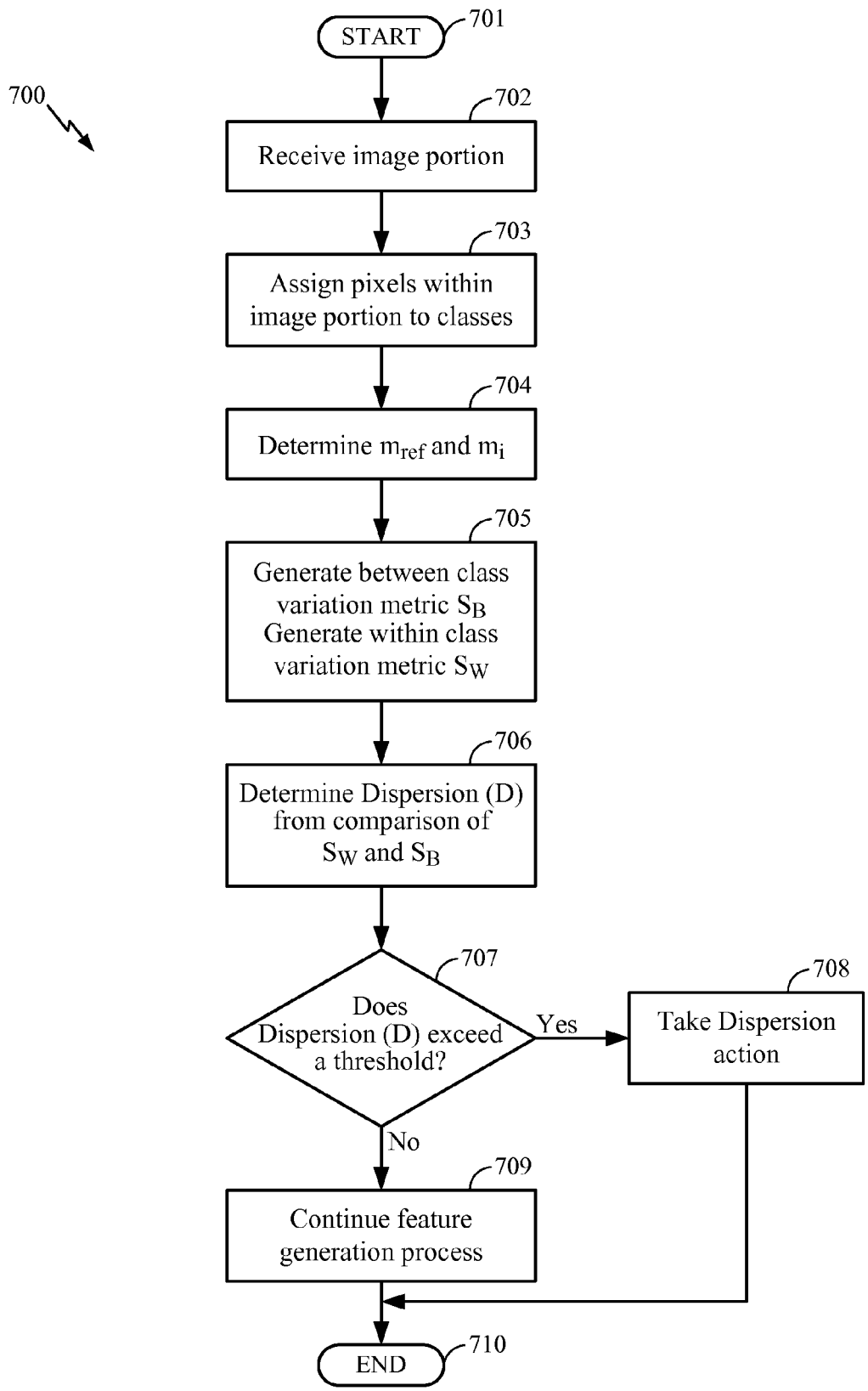
FIG. 7 is a flow diagram illustrating various operations of the dispersion discriminator in certain embodiments.
Figure 10A:
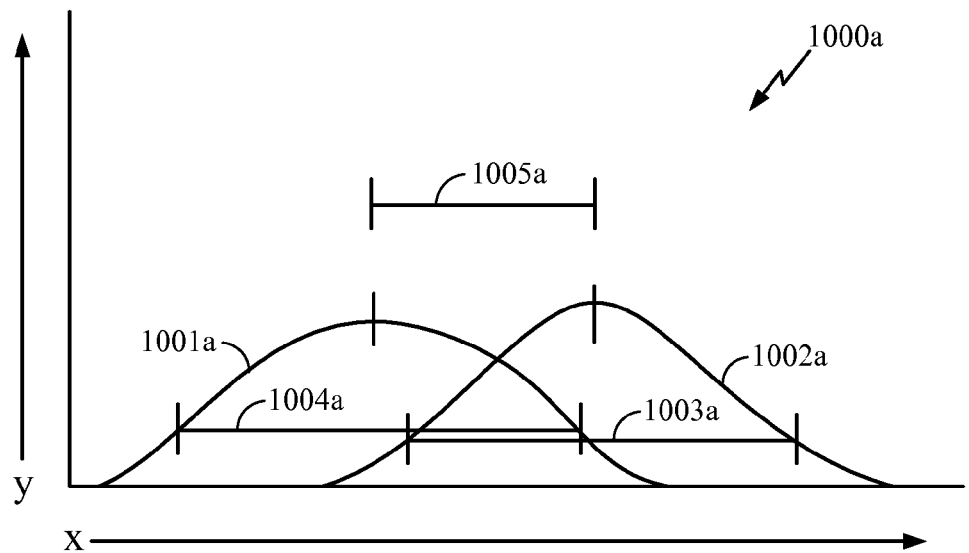
FIG. 10A illustrates a sample distribution having relatively high within class variance and relatively low between class variance.
Figure 10B:
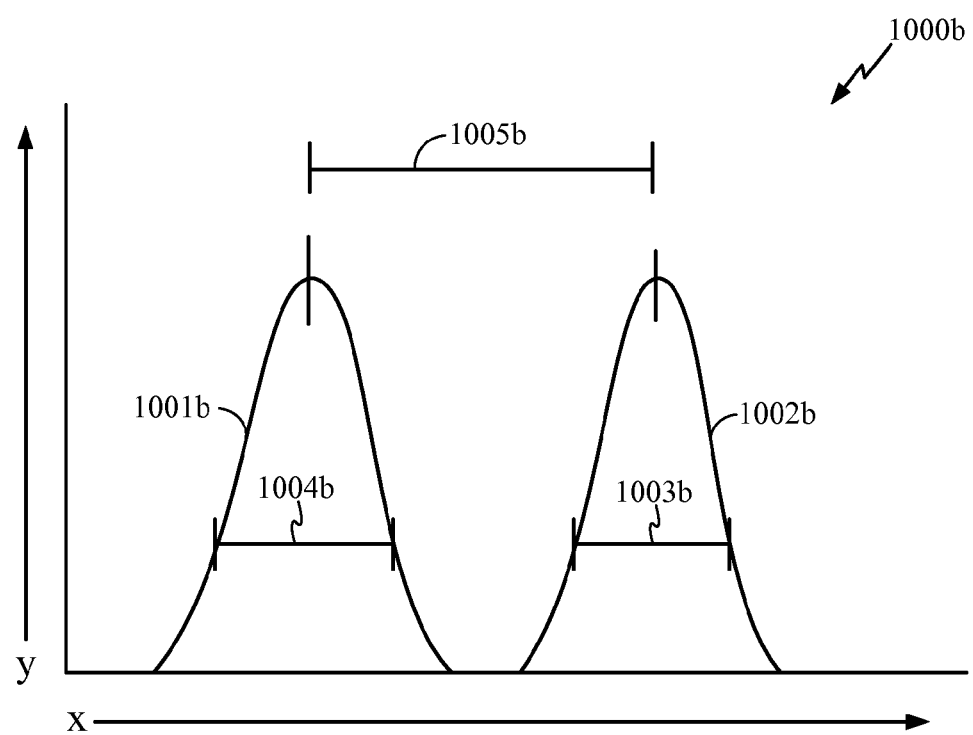
FIG. 10B illustrates a sample distribution having relatively low within class variance and relatively high between class variance.

FIG. 7 is a flow diagram illustrating various operations of the dispersion discriminator 502 used to determine if a portion of an image corresponds to a region of dispersed pixel data. For ease of understanding, FIG. 7 depicts the operations 700 of a discriminator 502 upon raw image pixels, though alternative methods (scale-space assessment, frequency domain assessment, etc.) may be used as described above. With brief reference to FIGS. 10A and 10B, the principles behind the operations 700 of the dispersion discriminator 502 of FIG. 7 will be described. These principles' implementation will then be discussed with reference to the details of FIG. 7. FIG. 10A depicts a measurement 1000a across sample values (x-axis) for two classes of data 1001a and 1001b. These two classes of data 1001a and 1002a are represented by two Gaussian distributions with "within class" variances 1004a, 1003a respectively and "between class" variance 1005a. FIG. 10B similarly represents two classes of data 1001b and 1002b, with associated "within class" variances 1004a, 1003b and "between class" variance 1005b. One may observe that the class distributions in FIG. 10A are more "dispersed" in the sense that the two classes contain greater overlap. A randomly chosen value has a high likelihood of falling in either class since both classes cover a wide range and both classes overlap more relative to the classes depicted in FIG. 10B. In contrast, FIG. 10B depicts a less dispersed distribution since the classes are more narrowly defined and may not overlap, as illustrated. Certain embodiments contemplate a value representing this relative dispersion loosely inspired by the Fischer Discrimination function of linear discriminant analysis. This value may represent the ratio of "within class" and "between class" variance as indicative of the distribution's "dispersion". In FIG. 10A, for example, the "between class" variance 1005a is smaller than in FIG. 10B, and the "within class" variances 1004a and 1003a are larger than in FIG. 10B. Conversely, in FIG. 10B the "between class" variance 1005b is larger than in FIG. 10A, and the "within class" variances 1004b and 1003b are smaller than in FIG. 10A. Certain embodiments contemplate determining pixel dispersion using "between class" and "within class" variances in a manner analogous to the discussion of FIGS. 10A-B.

Returning now to FIG. 7, the discriminator 502 in these embodiments seeks to determine the "within class" and "between class" distribution of the pixels in the image block 701 so that a measure of dispersion may be made. Before the discriminator receives an image portion 701, 702 the system quantizes the range of pixel values which may be found in the image. This may comprise quantization of pixel hue, luminosity or a similar pixel characteristic and may occur before the system employs the dispersion discriminator. While this step may occur after receipt of the image block, one will readily recognize that the ranges may be quantized in advance, prior to operating upon an image. The quantized ranges may be previously computed and stored in a table elsewhere on the mobile device 101 or server 102, for example. When the discriminator subsequently receives pixels 701, 702 in an image block of a "training image", the pixels are associated with their respective quantized ranges 703. Pixels falling within a common range are assigned a common class ID 703. That is, pixels whose values fall within the same quantization range comprise the same "class".

Figure 8A:
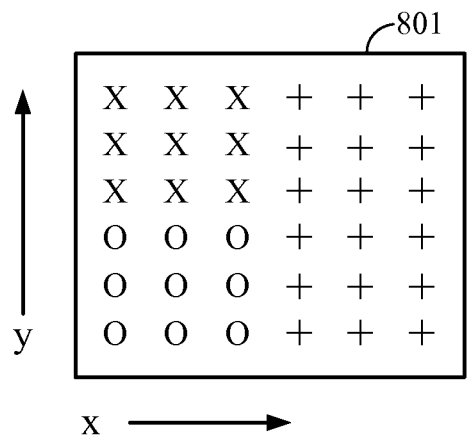
FIG. 8A illustrates one possible set of hue-based quantization levels for a 6×6 pixel block.
Figure 8B:
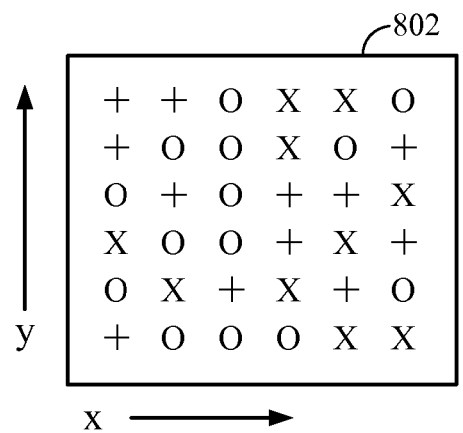
FIG. 8B illustrates one possible set of hue-based quantization levels for a 6×6 pixel block.
Figure 8C:
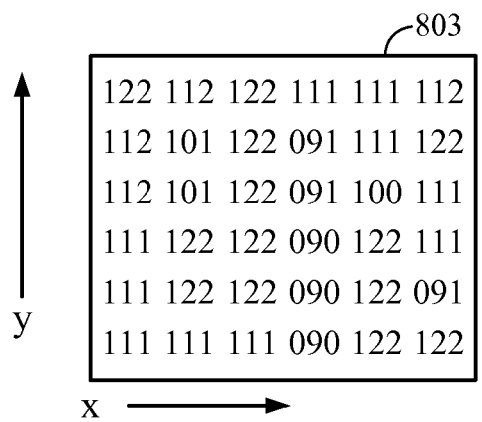
FIG. 8C illustrates another possible set of intensity-based quantization levels for a 6×6 pixel block.

Referring briefly to FIGS. 8A-C, these classes will be described in greater detail. FIG. 8A illustrates, as one possible example, a 6×6 image block 801 which contains 36 pixels. As mentioned, pixels falling within a given quantization range of the possible hues will be assigned an associated quantization level, or class ID. One skilled in the art will readily recognize numerous means for associating pixels with a quantization value, such as software code configured to compare the pixel value with a range. Thus, the pixels of FIG. 8A may be grouped into three classes as indicated by an "X", "O" and "+". These three regions are relatively "homogenous" in the sense that the pixels of a given quantization level tend to reside near one another, i.e. the "X" in the upper left, the "O" in the lower left, and the "+" to the right. FIG. 8B, in contrast, illustrates a pixel block 802 having the same dimensions, but composing a "dispersed" collection of pixels. Here pixels of a given quantization class are not necessarily located near one another within the block. As mentioned, although FIGS. 7 and 8A-B refer to color quantization, one skilled in the art will readily recognize numerous alternative pixel parameters which may be quantized. For example, FIG. 8C illustrates a dispersed distribution of pixels 803 as depicted by luminosity values. These pixel values may or may not be quantized depending upon the implementation. These values may comprise grayscale luminosity values or the like.

Returning again to FIG. 7, as mentioned, the pixels comprising the same quantization level may then be grouped into classes 703. Each class may then be used to determine a measure of "dispersion" in the image block in a manner analogous to that described above with respect to FIGS. 10A-B. As was described with respect to those figures, a "within class" and "between class" variance between classes may be used to determine a measure of dispersion. In the embodiments corresponding to FIG. 7, the measure of "between class" variation $S_B$ and the measure of "within class" variation $S_W$ 705 may be determined based on a between-class reference $m_{ref}$ and the moments of the classes $m_i$ 704 as described in further detail below.

The determination $m_{ref}$ and $m_i$, and the subsequent computation of $S_W$ and $S_B$, as contemplated in certain embodiments will now be described. Referring again to the image portion 702 of FIG. 7, consider a pixel region to be analyzed by the discriminator 502. Assume x and y refer to the column and row positions respectively of a pixel within the region, as is shown in FIGS. 8A-C and 9A-B. Thus, each pixel z in the region is associated with a position, i.e. z=(x,y). Furthermore, the pixel region may comprise N pixels and each of the N pixels may be categorized into one of C quantization classes. For example, if all the pixels in an image are associated with one of three quantization levels, then C=3 (this is the case in 8A). The mean $m_i$ also known as the first moment, or barycenter of the class of the $N_i$ data points of a particular class $Z_i$ may be defined as follows:

$$m_i = \frac{1}{N_i} \sum_{z \in Z_i} z \qquad \text{(Equation 1)}$$

Figure 9A:
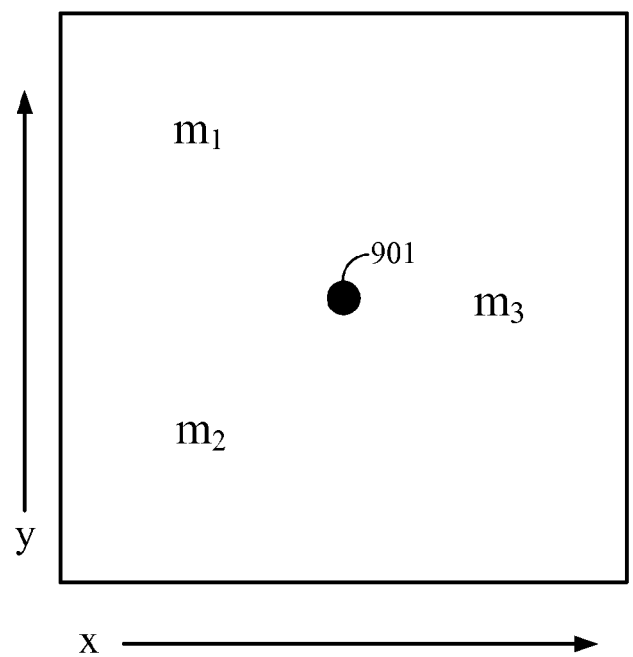
FIG. 9A illustrates a possible placement of between-class parameters, as used in certain embodiments of the dispersion discriminator, wherein the between-class variance is large in relation to the variance between parameters of FIG. 9B.
Figure 9B:
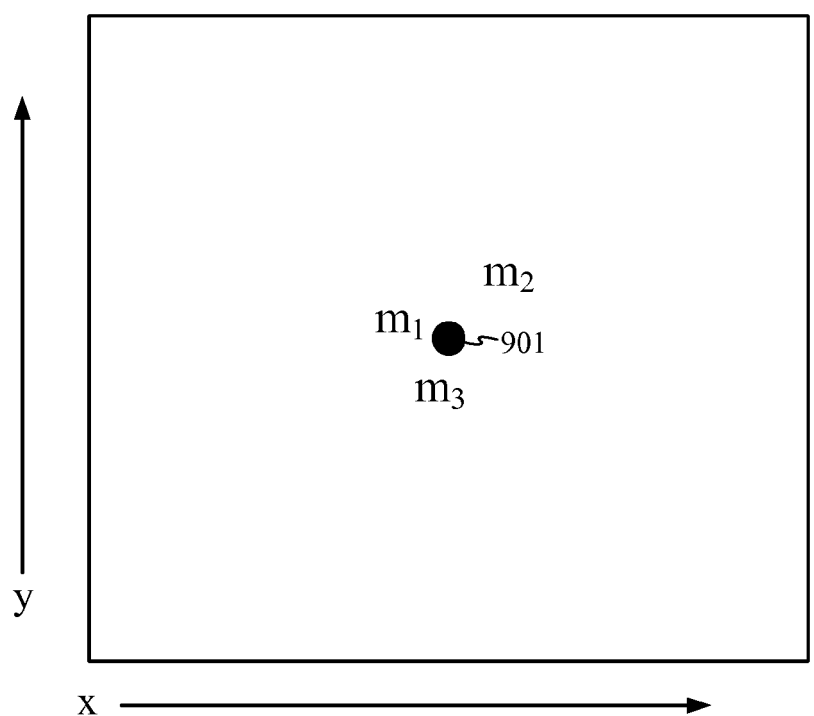
FIG. 9B illustrates a possible placement of between-class parameters, as used in certain embodiments of the dispersion discriminator, wherein the between-class variance is small in relation to the variance between parameters of FIG. 9A.

One skilled in the art will readily recognize numerous means for determining these moments, such as software code which sums the pixel position values and then divides by the number of pixels. The term $m_i$ refers to the position in the pixel region representing the average center position of each pixel in the class. As an example, FIG. 9A depicts the means $m_1$, $m_2$, and $m_3$ for each of the "X", "O", and "+" classes of FIG. 8A. Once the means $m_i$ have been determined for each of the classes, the within class variance for a class may be determined by summing the Euclidean distance of each pixel in the class relative to the class mean. The within class variances may then be accumulated across all C classes to form the value $S_W$ as follows:

$$S_W = \sum_{i=1}^{C} \sum_{z \in Z_i} \|z - m_i\|^2 \qquad \text{(Equation 2)}$$

The "between class" value $S_B$ may be determined as follows. A common reference point $m_{ref}$ may be selected for comparison between each of the class means $m_i$. In one embodiment, $m_{ref}$ may be the center 901 of the pixel region (position 9,9 of a 17×17 region, for example) and thus remains fixed with each pixel block considered. In some embodiments the reference will comprise a sub-pixel location and one of skill in the art will recognize that the reference need not correspond to a physical position. If the dimensions of the image portion vary between iterations, the reference position may likewise be modified. The "between class" measure $S_B$ may then be computed by taking the Euclidean distance of each class mean relative to the references:

$$S_B = \sum_{i=1_i}^{C} \|m_{ref} - m_i\|^2 \qquad \text{(Equation 3)}$$

Thus, $S_B$ refers to the variance between each class midpoint $m_i$ and the global reference $m_{ref}$ and thereby serves as an indication of between class variation. $S_W$ refers to the variance within the classes, that is, the distance within each of the classes to their mean $m_i$. As was described with respect to FIGS. 10A-B, certain of the present embodiments contemplate comparing these two measures 706, possibly as a ratio, as an indication of dispersion D in the pixel region.

$$D = \frac{S_W}{S_B} \qquad \text{(Equation 4)}$$

Thus, as the class centers are further distributed from one another (i.e., $S_B$ increases), the dispersion decreases (See FIGS. 8A and 9A). This would be the case when the image block comprises groups of similar hues whose class centers, or moments, are widely separated in the pixel region. Conversely, a tightly packed collection of class centers suggests that the classes are close together and that classes of quantized levels are either in close proximity or intermingled (i.e. $S_B$ decreases, see FIGS. 8B and 9B). In a similar manner, as class members become more tightly confined ($S_W$ decreases) dispersion decreases. As the class members become more widely separated ($S_W$ increases) dispersion increases. As discussed above, the system may also exclude regions of identical or "substantially-similar" pixels. In some embodiments, this may be accomplished by defining $S_B$ as being zero when the pixel region comprises only a single class. The value D would accordingly indicate very high or infinite dispersion. The value D may be further manipulated into a variety of forms to facilitate post-processing. For example, certain embodiments further consider taking the log of the inverse of the measure, as an indication of dispersion. Some embodiments may refer to this as the entropy "E" of the distribution.

$$E = -\log \frac{S_B}{S_W} \qquad \text{(Equation 5)}$$

Regions of high entropy would accordingly be excluded. As discussed above, by defining $S_B$ as being zero in regions of substantially-similar or identical pixels (i.e. pixels falling within a specified range) the entropy may likewise be extremely high or infinite in these regions, again leading to exclusion of the image portion from the process.

The discriminator 502 may compare the dispersion measure D to a threshold value 707 and thereby determine if the image block corresponds to a dispersed pixel distribution. A first course of action 708 may be taken when the measure exceeds the threshold, and an alternative course 709, when it does not. For example, switch 501 may be operated based on the determination as described above. These thresholds may be preset, determined in advance through trial and error, informed prediction, or generated dynamically based on previous training sessions. Alternative means for determining the course of action, such as fuzzy logic, machine learning methods, and the like, will be readily envisioned by one skilled in the art. After the determination is made, the process ends 710 and a new portion of the image is received for processing. If no further portions require processing, the system halts.

Although the "between" and "within" class discrimination measure described with respect to FIGS. 10A-B comprises one class of embodiments of the dispersion discriminator, one skilled in the art will readily recognize alternative means for generating a dispersion value. For example, the frequency representation of the pixel region may be taken, such as by a Fourier transform. Regions comprising a larger number of frequencies may be classified as having a greater dispersion than regions with fewer frequencies.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

The invention claimed is:

1. A method for generating features, performed by at least one processor, comprising:
by the at least one processor, associating a dispersion value with at least a portion of an image, wherein said associating the dispersion value comprises:
assigning pixels within the at least a portion of the image to classes;
based on the pixel assignments, determining a measure of within-class variation in the at least a portion of the image and a measure of between-class variation in the at least a portion of the image; and
comparing the within-class variation measure and the between-class variation measure to determine the dispersion value; and
by the at least one processor, excluding at least a part of the at least a portion of the image from at least a portion of a feature generation process if the dispersion value indicates that dispersion in the at least a portion of the image exceeds a threshold.

2. The method of claim 1, wherein excluding the portion comprises substituting the at least a portion of the image with different values before the at least a portion of the image is processed by the at least a portion of the feature generation process.

3. The method of claim 1, wherein the dispersion value comprises a measure of the entropy of the pixel values within the portion of the image.

4. The method of claim 1, wherein the dispersion value comprises a frequency characteristic of the portion of the image.

5. The method of claim 1, wherein said assigning comprises associating pixels within the at least a portion of the image with a quantization value, and
wherein said determining comprises:
determining the first moment for collections of pixels having the same quantization value; and
measuring the distance between the first moments of at least two collections.

6. The method of claim 5, wherein the distance between the first moments of at least two collections is inversely proportional to the value of the dispersion value.

7. The method of claim 1, wherein the feature generation process comprises at least a portion of a scale-invariant feature transform (SIFT).

8. The method of claim 1, wherein the feature generation process comprises a module configured to compute a scale-space difference of an image.

9. A non-transitory computer-readable medium comprising instructions configured to cause an electronic device to perform the steps of:

associating a dispersion value with at least a portion of an image, wherein said associating the dispersion value comprises:

assigning pixels within the at least a portion of the image to classes;

based on the pixel assignments, determining a measure of within-class variation in the at least a portion of the image and a measure of between-class variation in the at least a portion of the image; and comparing the within-class variation measure and the between-class variation measure to determine the dispersion value; and excluding at least a part of the at least a portion of the image from at least a portion of a feature generation process if the dispersion value indicates that dispersion in the at least a portion of the image exceeds a threshold.

10. The non-transitory computer-readable medium of claim 9, wherein excluding the portion comprises substituting the at least a portion of the image with different values before the at least a portion of the image is processed by the at least a portion of the feature generation process.

11. The non-transitory computer-readable medium of claim 9, wherein the dispersion value comprises a measure of the entropy of the pixel values within the portion of the image.

12. The non-transitory computer-readable medium of claim 9, wherein the dispersion value comprises a frequency characteristic of the portion of the image.

13. The non-transitory computer-readable medium of claim 9, wherein said assigning comprises associating pixels within the at least a portion of the image with a quantization value, and wherein said determining comprises:

determining the first moment for collections of pixels having the same quantization value; and measuring the distance between the first moments of at least two collections.

14. The non-transitory computer-readable medium of claim 13, wherein the distance between the first moments of at least two collections is inversely proportional to the value of the dispersion value.

15. The non-transitory computer-readable medium of claim 9, wherein the feature generation process comprises at least a portion of a scale-invariant feature transform (SIFT).

16. The non-transitory computer-readable medium of claim 9, wherein the feature generation process comprises a module configured to compute a scale-space difference of an image.

17. The non-transitory computer-readable medium of claim 9, wherein the electronic device comprises a wireless telephone.

18. An electronic device comprising:

a dispersion discriminator configured to associate a dispersion value with at least a portion of an image, wherein said associating the dispersion value comprises:

assigning pixels within the at least a portion of the image to classes;

based on the pixel assignments, determining a measure of within-class variation in the at least a portion of the image and a measure of between-class variation in the at least a portion of the image; and comparing the within-class variation measure and the between-class variation measure to determine the dispersion value; and excluding means configured to exclude at least a part of the at least a portion of the image from at least a portion of a feature generation process if the dispersion value indicates that dispersion in the at least a portion of the image exceeds a threshold.

19. The electronic device of claim 18, wherein excluding the portion comprises substituting the at least a portion of the image with different values before the at least a portion of the image is processed by the at least a portion of the feature generation process.

20. The electronic device of claim 18, wherein the dispersion value comprises a measure of the entropy of the pixel values within the portion of the image.

21. The electronic device of claim 18, wherein the dispersion value comprises a frequency characteristic of the portion of the image.

22. The electronic device of claim 18, wherein said assigning comprises associating pixels within the at least a portion of the image with a quantization value, and wherein said determining comprises:

determining the first moment for collections of pixels having the same quantization value; and measuring the distance between the first moments of at least two collections.

23. The electronic device of claim 22, wherein the distance between the first moments of at least two collections is inversely proportional to the value of the dispersion value.

24. The electronic device of claim 18, wherein the feature generation process comprises at least a portion of a scale-invariant feature transform (SIFT).

25. The electronic device of claim 18, wherein the feature generation process comprises a module configured to compute a scale-space difference of an image.

26. The electronic device of claim 18, wherein the electronic device comprises a wireless telephone.

27. An electronic device comprising:

means for associating a dispersion value with at least a portion of an image, wherein said means for associating comprises:

means for assigning pixels within the at least a portion of the image to classes;

means for determining, based on the pixel assignments, a measure of within-class variation in the at least a portion of the image and a measure of between-class variation in the at least a portion of the image; and means for comparing the within-class variation measure and the between-class variation measure to determine the dispersion value; and means for excluding at least a part of the at least a portion of the image from at least a portion of a feature generation process if the dispersion value indicates that dispersion in the at least a portion of the image exceeds a threshold.

28. The electronic device of claim 27, wherein the determining means comprises a dispersion discriminator software module configured to determine the between-class variance and the within-class variance, and wherein the excluding means comprises a switch.

29. The electronic device of claim 27, wherein excluding the portion comprises substituting the at least a portion of the image with different values before the at least a portion of the image is processed by the at least a portion of the feature generation process.

30. The electronic device of claim 27, wherein the dispersion value comprises a measure of the entropy of the pixel values within the portion of the image.

31. The electronic device of claim 27, wherein the dispersion value comprises a frequency characteristic of the portion of the image.

32. The electronic device of claim 27, wherein the means for assigning comprises means for associating pixels within the at least a portion of the image with a quantization value, and
wherein said determining means comprises:
means for determining the first moment for collections of pixels having the same quantization value; and
means for measuring the distance between the first moments of at least two collections.

33. The electronic device of claim 32, wherein the distance between the first moments of at least two collections is inversely proportional to the value of the dispersion value.

34. The electronic device of claim 27, wherein the feature generation process comprises at least a portion of a scale-invariant feature transform (SIFT).

35. The electronic device of claim 27, wherein the feature generation process comprises a module configured to compute a scale-space difference of an image.

36. The electronic device of claim 27, wherein the electronic device comprises a wireless telephone.

* * * * *